United States Patent
Yamamoto et al.

(10) Patent No.: US 10,662,018 B2
(45) Date of Patent: May 26, 2020

(54) ADHESIVE TAPE, ADHESIVE TAPE ROLL, AND TAPE DISPENSER

(71) Applicant: FUKUMARU CO., LTD., Fukuoka-shi, Fukuoka (JP)

(72) Inventors: Masakazu Yamamoto, Fukuoka (JP); Katsuyoshi Fukuyama, Fukuoka (JP)

(73) Assignee: FUKUMARU CO., LTD., Fukuoka (JP)

( * ) Notice: Subject to any disclaimer, the term of this patent is extended or adjusted under 35 U.S.C. 154(b) by 280 days.

(21) Appl. No.: 15/025,405

(22) PCT Filed: Oct. 16, 2014

(86) PCT No.: PCT/JP2014/077532
§ 371 (c)(1),
(2) Date: Mar. 28, 2016

(87) PCT Pub. No.: WO2015/060187
PCT Pub. Date: Apr. 30, 2015

(65) Prior Publication Data
US 2016/0237320 A1    Aug. 18, 2016

(30) Foreign Application Priority Data

Oct. 23, 2013 (JP) .................. 2013-220420
Oct. 10, 2014 (JP) .................. 2014-208899

(51) Int. Cl.
*B65H 35/00* (2006.01)
*B65H 35/10* (2006.01)
*C09J 7/22* (2018.01)

(52) U.S. Cl.
CPC ....... *B65H 35/0026* (2013.01); *B65H 35/008* (2013.01); *B65H 35/10* (2013.01);
(Continued)

(58) Field of Classification Search
CPC .... C09J 7/0275; C09J 7/0264; C09J 2201/20; C09J 2423/106; C09J 2201/122; B65H 35/10; B65H 35/008; B65H 35/0026
See application file for complete search history.

(56) References Cited

U.S. PATENT DOCUMENTS 1,032,026 A * 7/1912 Roden ................ B65D 85/1027
                                                         229/203
3,368,669 A * 2/1968 Anderson ............. B29C 59/007
                                                         242/160.4
(Continued)

FOREIGN PATENT DOCUMENTS

CN    2567185 Y    8/2003
JP    H05-22534 U  3/1993
(Continued)

OTHER PUBLICATIONS

Jan. 27, 2015 Search Report issued in International Patent Application No. PCT/JP2014/077532.
(Continued)

*Primary Examiner* — Jonathan G Riley
(74) *Attorney, Agent, or Firm* — Oliff PLC

(57) ABSTRACT

The adhesive tape according to the present invention comprises a tape which comprises a long plastic film having a predetermined width and a predetermined thickness and adhesive layers which are arranged on the tape, wherein at least one row of multiple slits are arranged at regular intervals along the length direction in a region of the tape which turns inward from each end of a first surface as observed in a width direction, each of the slits is formed by a narrow and long concave groove which is depressed to a predetermined depth from the first surface and a crack; which is formed on the bottom of the concave groove and is formed at a predetermined depth toward a second surface, (Continued)

and the adhesive layer is formed on the first surface having the slits formed thereon.

7 Claims, 14 Drawing Sheets

(52) U.S. Cl.
CPC .......... *C09J 7/22* (2018.01); *C09J 2201/122* (2013.01); *C09J 2201/20* (2013.01); *C09J 2423/106* (2013.01)

(56) References Cited

U.S. PATENT DOCUMENTS

| | | | | |
|---|---|---|---|---|
| 4,188,442 A * | 2/1980 | Asakura | .................. | B32B 27/10 428/216 |
| 4,647,485 A * | 3/1987 | Nelson | ....................... | C09J 7/20 428/43 |
| 5,130,185 A * | 7/1992 | Ness | .......................... | C09J 7/38 428/41.9 |
| 5,246,775 A * | 9/1993 | Loscuito | ................. | E04F 13/04 428/343 |
| 5,366,775 A * | 11/1994 | Kao | ........................... | C09J 7/22 428/41.5 |
| 6,756,102 B1 * | 6/2004 | Galo | .......................... | C09J 7/20 428/43 |
| 8,465,834 B2 * | 6/2013 | Kim | ....................... | B32B 15/08 428/343 |
| 2003/0178124 A1 * | 9/2003 | Mikami | .................. | B44C 1/105 156/87 |
| 2007/0172620 A1 * | 7/2007 | Rodewald | ................. | C09J 7/22 428/40.1 |
| 2008/0038501 A1 * | 2/2008 | Velasquez Urey | .. | H05K 13/021 428/43 |
| 2013/0064481 A1 * | 3/2013 | Yamamoto | .............. | B32B 3/266 383/200 |
| 2013/0115388 A1 * | 5/2013 | Tseng | ......................... | C09J 7/22 428/34.1 |
| 2014/0138025 A1 * | 5/2014 | Bartusiak | ............... | B05D 1/325 156/280 |
| 2014/0263528 A1 * | 9/2014 | Ormerod | ............ | B65H 35/0026 225/77 |
| 2014/0363605 A1 * | 12/2014 | Ogawa | ........................ | C09J 7/21 428/43 |
| 2016/0160088 A1 * | 6/2016 | Yen | ............................. | C09J 7/20 428/43 |
| 2018/0257346 A1 * | 9/2018 | Austin | .................... | C03C 27/10 |

FOREIGN PATENT DOCUMENTS

| | | |
|---|---|---|
| JP | H08-113414 A | 5/1996 |
| JP | H10-237400 A | 9/1998 |
| JP | H11-5956 A | 1/1999 |
| JP | H11-293205 A | 10/1999 |
| JP | 2013-067772 A | 4/2013 |
| JP | 2013-209540 A | 10/2013 |
| TW | 201408150 A | 2/2014 |
| WO | 2013/016182 A2 | 1/2013 |

OTHER PUBLICATIONS

Jan. 27, 2015 Written Opinion issued in International Patent Application No. PCT/JP2014/077532.
Jun. 4, 2018 Office Action issued in Chinese Patent Application No. 201480058155.9.
Jan. 23, 2017 Office Action issued in Taiwanese Patent Application No. 103136693.

* cited by examiner

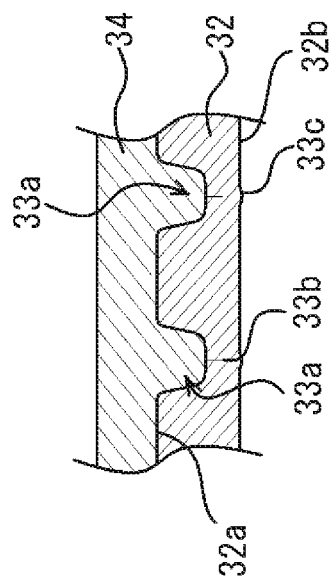
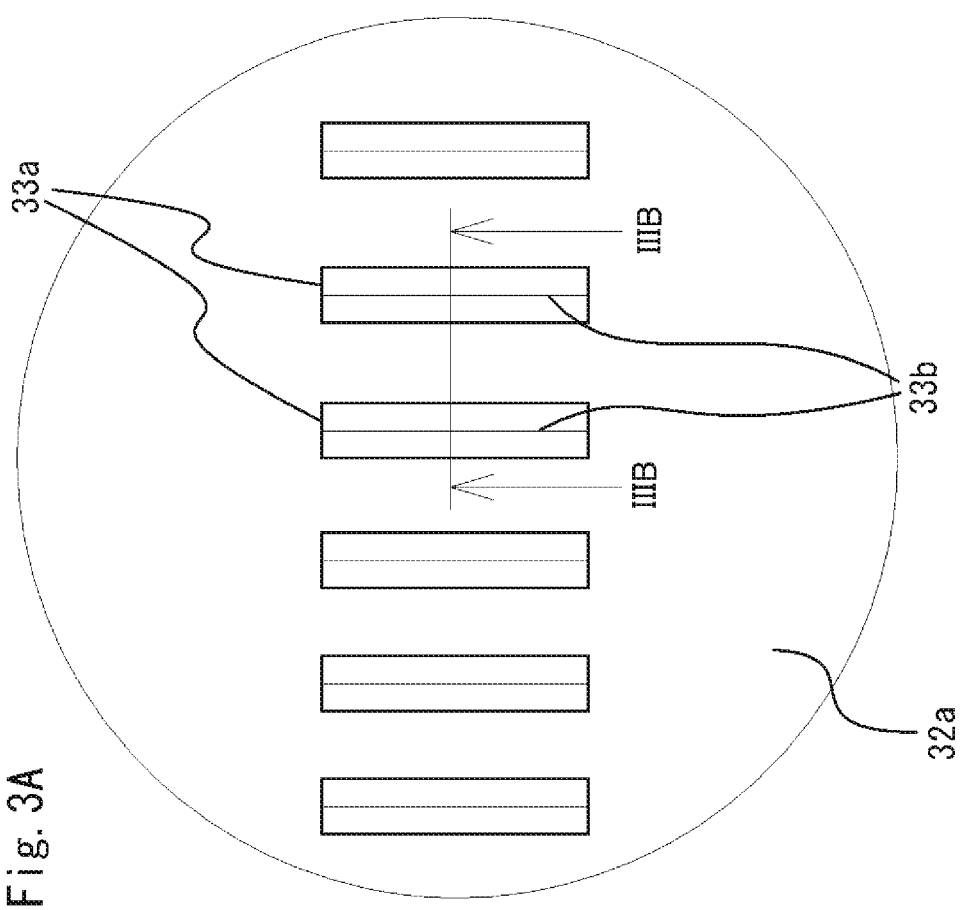

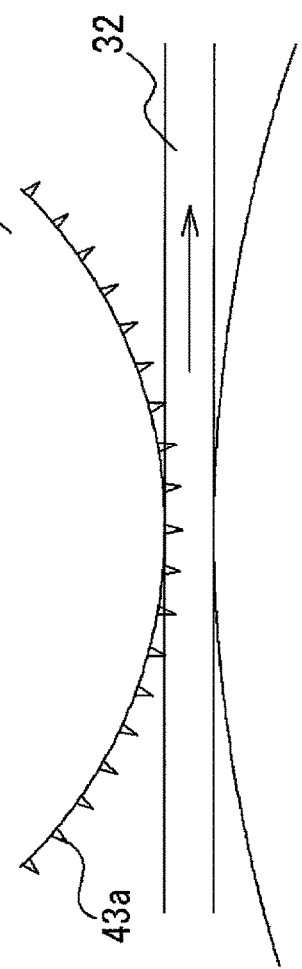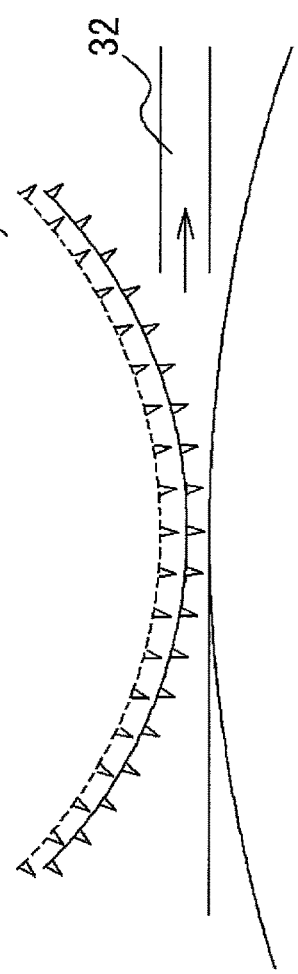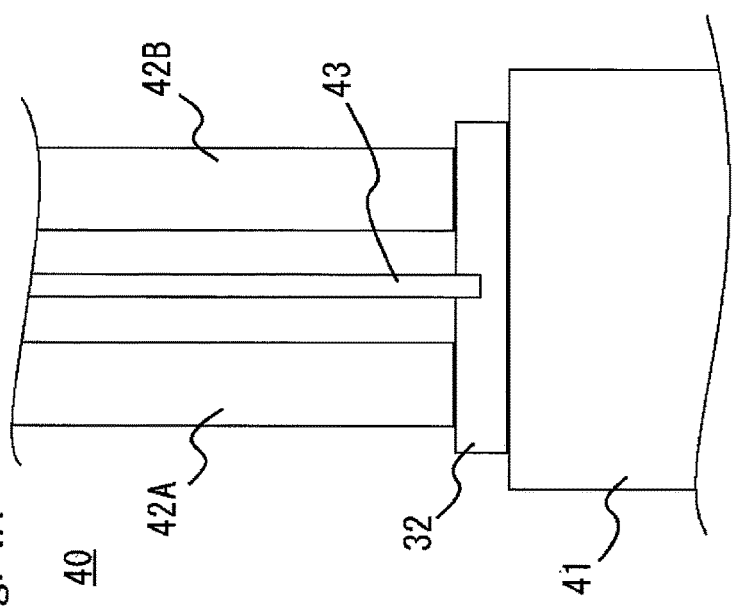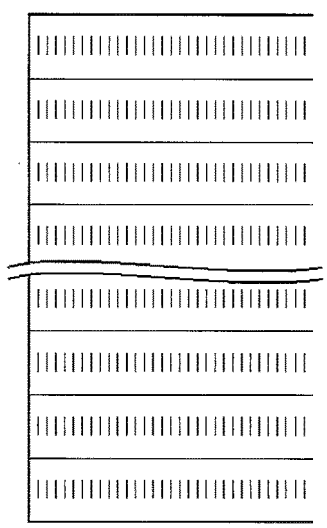

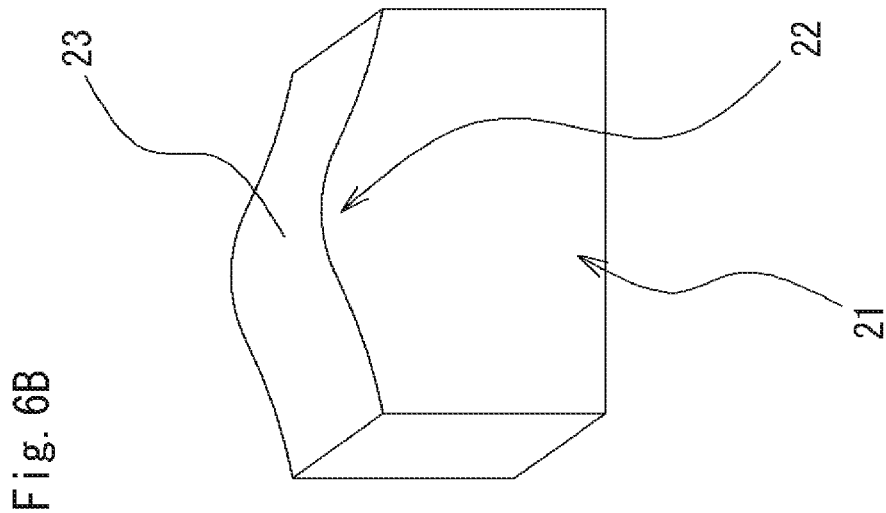
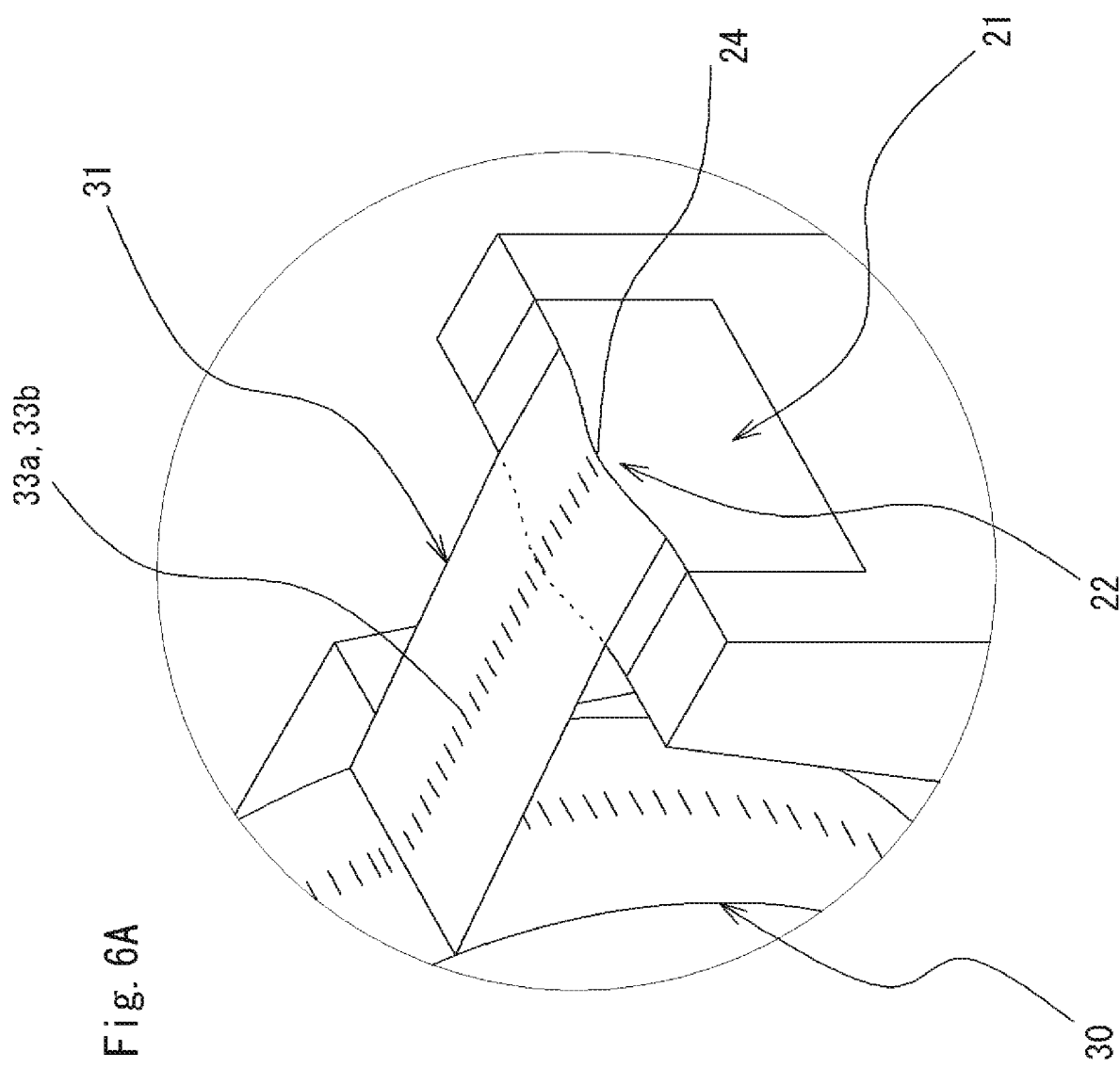

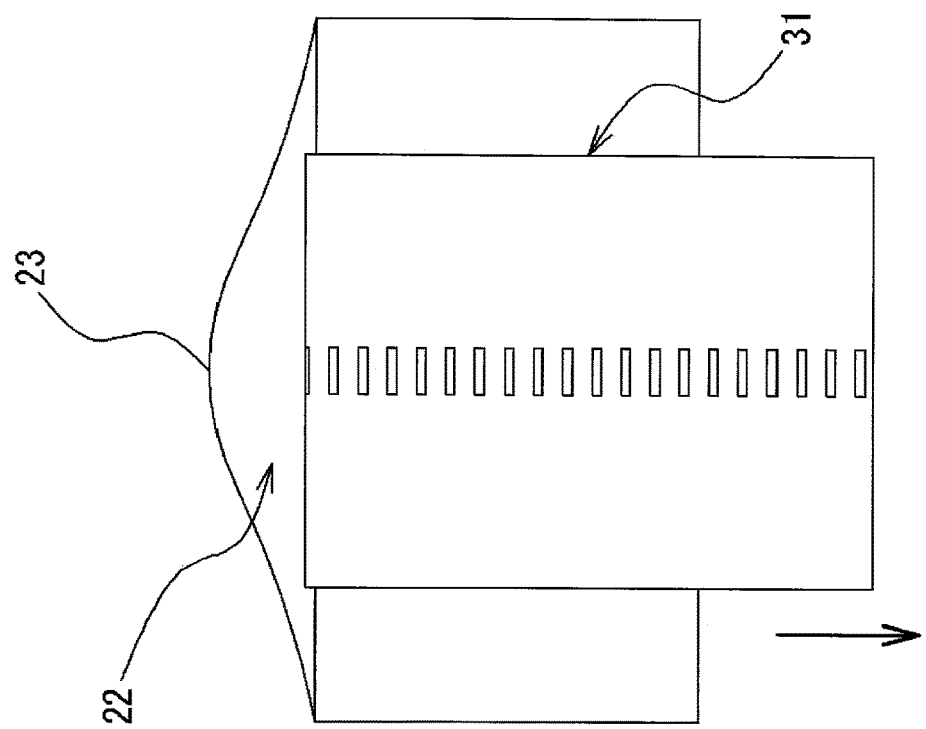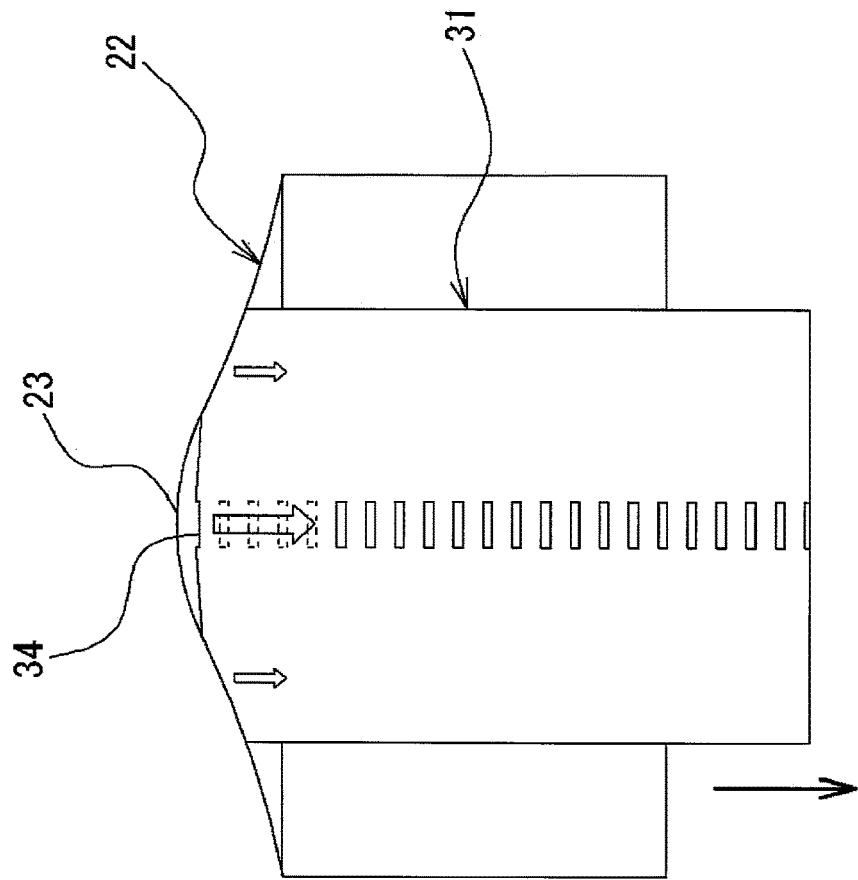

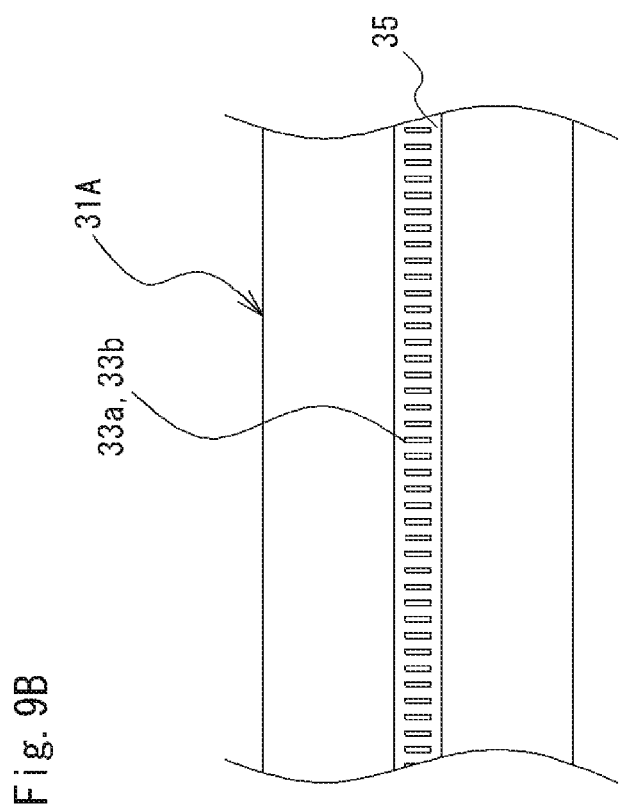
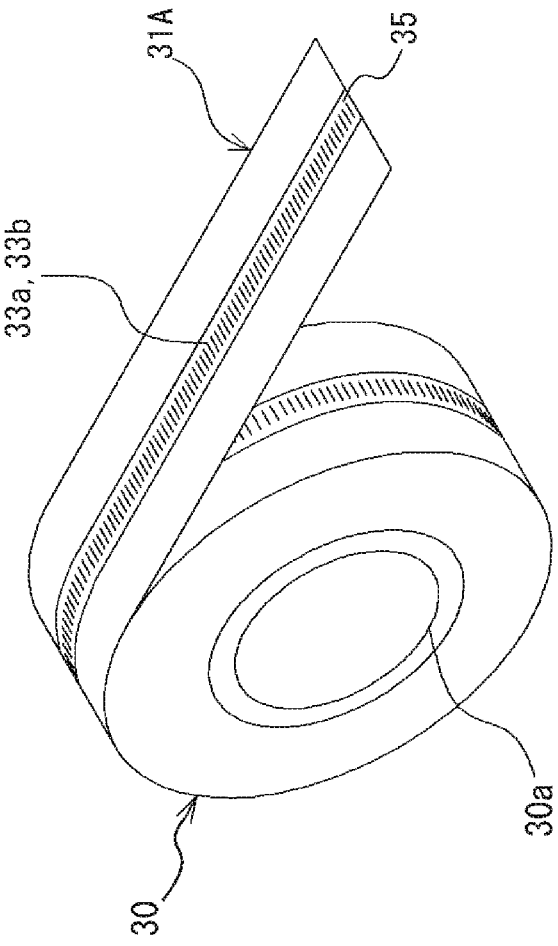

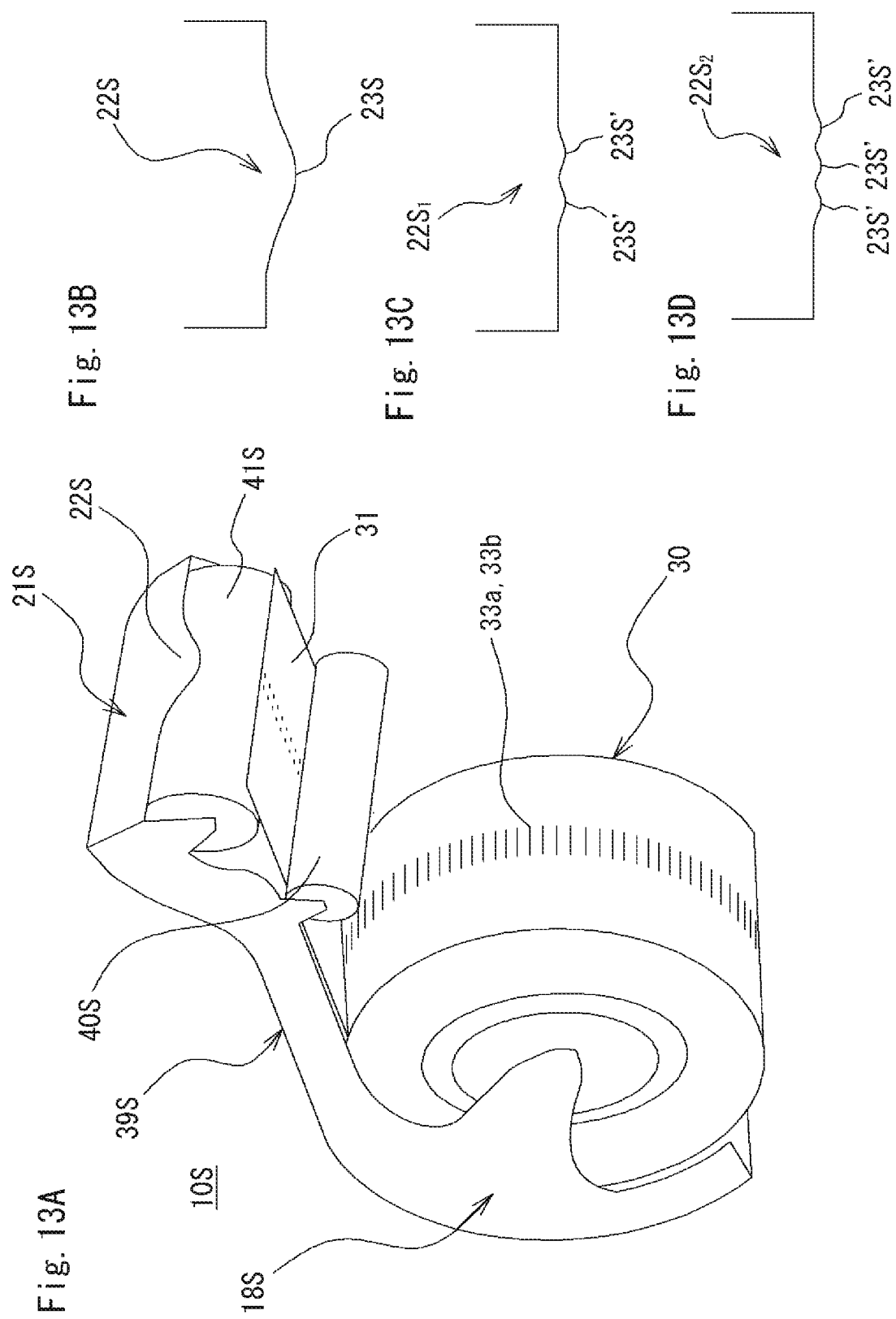

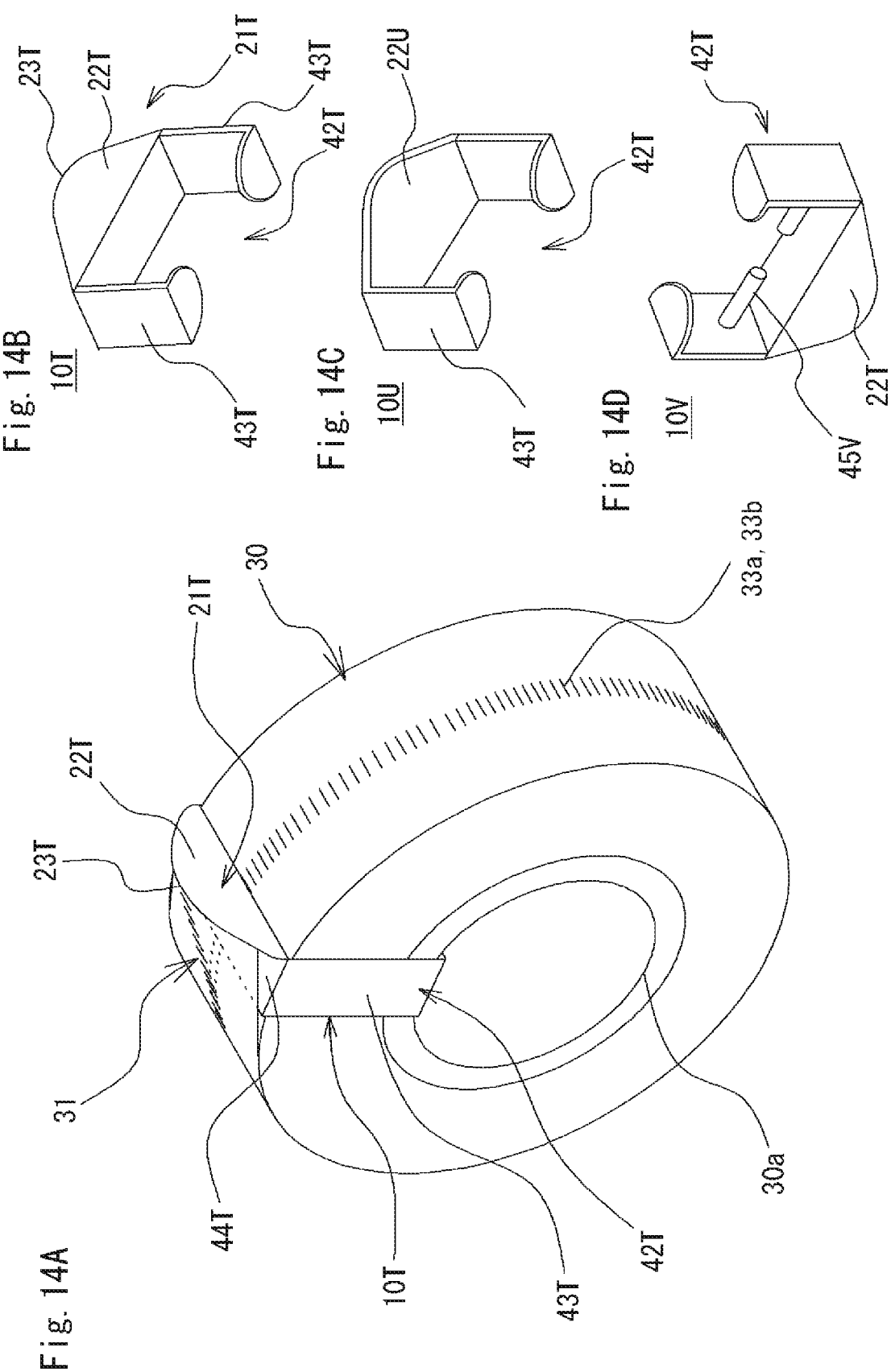

— 1 —
ADHESIVE TAPE, ADHESIVE TAPE ROLL, AND TAPE DISPENSER

FIELD

The present invention relates to an adhesive tape that can be easily cut into a desired length and that has a great strength, and to an adhesive tape roll and a tape dispenser.

BACKGROUND

Cutters such as utility knifes, scissors, and saw blades have conventionally been used to cut an adhesive tape into desired lengths. The use of such a cutter has a risk of causing injuries to users. In order to solve such an issue, the following Patent Literatures 1 and 2 describe adhesive tapes that can be cut into a fixed length without the use of a cutter. The adhesive tape according to the following Patent Literature 1 is wound around a winding core with an adhesive layer provided on one side. In a surface of the adhesive tape, cuts or dashed perforations for cutting are formed at a predetermined interval. The adhesive tape according to the following Patent Literature 2 has a cut along the length direction in an inner region apart from each edge of the tape. The adhesive tape described in Patent Literature 1 has cuts or dashed perforations for cutting formed thereon at a predetermined interval, and pulling the tape with one's fingers to tear it along one of the cuts or perforations can easily cut the tape. The adhesive tape described in Patent Literature 2 can be easily cut with a force of one's fingers and its minute degradation in strength can prevent an unintended tape cut during manufacturing processes and the application of the tape as well as during distribution of products with the tape attached thereto.

The following Patent Literature 3 describes a tape dispenser for such an adhesive tape provided with cutting perforations at a predetermined interval. The tape dispenser according to Patent Literature 3 includes: a tape storing part that can store therein a prewound tape in a manner drawable by one end, the tape having an adhesive agent applied on the back surface and perforations at a desired interval; a plurality of blades disposed along a projected surface for assisting a cut along one of the perforations in the drawn tape; and a tape attaching surface projecting from a travel path of the tape for temporarily attaching the adhesive surface of the tape thereto. With this tape dispenser, when a user pulls out the adhesive tape by holding one end and pressing one of the perforations against the blades that assist the cut along the perforation, the adhesive surface of the tape in a proximity of and in front of the perforation temporarily attaches to the tape attaching surface to stop the drawout motion of the tape and the adhesive tape is cut along the perforation with the assistance of appropriate blades.

CITATION LIST

Patent Literature

Patent Literature 1: Japanese Unexamined Utility Model Application Publication No. 05-022534
Patent Literature 2: Japanese Unexamined Patent Application No. 11-005956
Patent Literature 3: Japanese Unexamined Patent Application No, 08-113414

SUMMARY

Technical Problem

The adhesive tape described in Patent Literature 1 has perforations formed in a width direction of the adhesive tape. If such perforations are formed in the tape, the tape could be cut along one of the perforations halfway to a desired length while being pulled off. If the perforations are formed at a predetermined interval, the length of the tape to be used is limited to the length corresponding to the interval. While the shortening of the perforations interval allows a user to cut the tape into a desired length, this lowers the tensile strength of the tape, which could result in a cut of the tape halfway to the desired length. In addition, the adhesive tape with perforations formed thereon also has cuts in the side parts, making these parts vulnerable to a cut. If such an adhesive tape is used for packaging, the tape has a risk of being cut during transportation.

The adhesive tape described in Patent Literature 2 has a cut composed of through-holes penetrating the tape or a combination of through holes and non-through holes randomly positioned thereon. Because through-holes and the like are randomly positioned in the tape to form the cut, substantial force may be required to cut the tape, which may not be easy. In addition, the hand-tearing property of a tape with through-holes cannot be controlled because the depth of the holes cannot be adjusted as the through-holes penetrate the tape. Furthermore, the edges of through-holes project from a tape surface and form unevenness thereon, which instabilizes a coating formed on the surface for easy-peeling. Furthermore, when being wound around a roll, the unevenness makes the wound tape bulky and prevents a significant length of the tape from being wound. As described above, such a tape has various issues.

The present invention is made to solve the issues present in the conventional art described above. An objective of the present invention is to provide an adhesive tape that can be safely and easily cut by cutting means including an angled protrusion having an obtuse top part without causing injuries to a user's fingers or the like, that can be easily cut after being applied to a target object, with a force of one's fingers without the use of a cutting device such as a knife, and that can maintain the tensile strength required for conventional tapes to prevent an unintended cut or breakage, and to provide an adhesive tape roll thereof.

Another objective of the present invention is to provide an adhesive tape to which a favorable coating can be applied and a significant length of which can be wound around a roll body without being bulky, and to provide an adhesive tape roll thereof.

Yet another objective of the present invention is to provide an adhesive tape that users can easily recognize as an adhesive tape having the features described above, and to provide an adhesive tape roll thereof.

Still another objective of the present invention is to provide a tape dispenser that can safely and easily cut an adhesive tape by cutting means including an angled protrusion having an obtuse top part instead of conventional sharp cutting blades.

Solution to Problem

In order to solve the issues described above, an adhesive tape according to a first aspect of the present invention includes a tape made of a long plastic film having a predetermined width and a predetermined thickness, and an adhesive layer disposed on a first surface of the tape, in which the tape has a plurality of concave grooves and cracks extending along the width direction are provided at predetermined intervals in the length direction in a center region that is inward from both edges of a first surface of the tape, each of the concave grooves is an narrow and long concave groove which is recessed to a predetermined depth from the surface of the first surface, each of the cracks formed halfway from the bottom of the concave groove to the surface of the second surface, and the adhesive layer is formed on the first surface and in the concave grooves having the slit.

An adhesive tape according to a third aspect has the adhesive layer on the adhesive tape according to the first aspect, except on a region in a predetermined width from at least one edge portion in a width direction of the tape.

An adhesive tape according to a fourth aspect is provided with a tape identification marking for identifying the tape on at least one surface of the first or the second surface of the tape according to the first aspect.

An adhesive tape roll according to a fifth aspect winds the adhesive tape according to the first aspect into a roll with a releasing agent applied on the second surface.

A tape dispenser according to a sixth aspect includes a tape holding part for rotatably holding the adhesive tape roll according to the fifth aspect; and cutting means for cutting the adhesive tape pulled out of the adhesive tape roll, in which the cutting means includes a cutting part including an angled protrusion having an obtuse top part at the center in a width direction of the adhesive tape.

A tape dispenser according to a seventh aspect includes an attachment part that is attached to the adhesive tape roll according to the fifth aspect, and cutting means for cutting the adhesive tape pulled out of the adhesive tape roll, in which the attachment part includes arm parts for being wrapped around and holding the adhesive tape roll, and the cutting means includes a cutting part including an angled protrusion having an obtuse top part at the center in a width direction of the adhesive tape.

Advantageous Effects of Invention

The adhesive tapes of the first aspect configured as described above provide the following effects. That is:

(a) The adhesive tape has concave grooves and cracks, and thus can be safely and easily cut by cutting means including an angled protrusion having an obtuse top part without causing an injury to a user's fingers or the like.

(b) Without the use of such a cutting means, the adhesive tape can also be cut easily with a force of the tips of fingers or nails, or the like pressed against a part of the adhesive tape in which concave grooves and cracks are formed. Even after applied to a target object, the adhesive tape can still be cut easily with a force of one's fingers without the use of a cutting device such as a knife.

(c) In addition, the tensile strength required for conventional adhesive tapes is maintained because the concave grooves and cracks do not penetrate the tape, thereby preventing an unintended cut or breakage. Specifically, an unintended cut or breakage of the adhesive tape can be prevented during a manufacturing process of the tape or during the application of the tape to products, as well as during distribution of the products with the tape attached thereto.

(d) Furthermore, satisfactory processing, such as printing, can be performed on the second surface because the concave grooves and cracks do not penetrate the adhesive tape. Also, a larger length of the tape can be wound around the roll without being bulky.

The adhesive tape according to the third aspect can be easily peeled off after attachment.

The adhesive tape according to the fourth aspect can be identified in the difference from conventional adhesive tapes.

The adhesive tape roll according to the fifth aspect can obtain the benefit of the adhesive tape according to any one of the first to the fourth aspects. The adhesive tape roll may include a core material formed of a paper material or the like in a predetermined diameter.

The tape dispenser according to the sixth aspect includes cutting means with a cutting part formed in a protruding manner. One of the cut portions formed in the center part of the adhesive tape is aligned with the protruded cutting part, thereby enabling the adhesive tape to be easily cut. The cutting part is not a blade or a sharp protrusion, which lessens the possibility of injuries or the like.

The adhesive tape cutting tool according to the seventh aspect includes cutting means with a cutting part formed in a protruding manner. One of the cut portions formed in the center part of an adhesive tape is aligned with the protruded cutting part, thereby enabling the adhesive tape to be easily cut. The cutting part is not a blade or a sharp protrusion, which lessens the possibility of injuries or the like. The adhesive tape cutting tool refers to any tool that can cut an adhesive tape directly attached to an adhesive tape roll, for example, a tape cutter.

BRIEF DESCRIPTION OF DRAWINGS

FIG. 3A is an enlarged view of the part IIIA in FIG. 2B. FIG. 3B is a sectional view taken along the line IIIB-IIIB in FIG. 3A.

FIG. 4 illustrates concave grooves and cracks forming apparatuses. FIG. 4A is a perspective view of a portion of a concave grooves and cracks forming apparatus. FIG. 4B is a perspective view of a portion of the concave grooves and cracks forming apparatus viewed from another angle of FIG. 4A. FIG. 4C is a perspective view of a portion of another concave grooves and cracks forming apparatus. FIG. 4D is a plane view of a raw film sheet.

FIG. 6 illustrates the tape dispenser. FIG. 6A is an enlarged view of the part VIA in FIG. 1. FIG. 6B is a perspective view of a cutting means.

FIG. 7A is a front view illustrating a process of cutting an adhesive tape. FIG. 7B is a front view illustrating a state after the cutting.

FIG. 9 illustrates an adhesive tape according a first modification. FIG. 9A is a perspective view of an adhesive tape roll around which the adhesive tape according to the first modification is wound. FIG. 9B is a plane view of the adhesive tape.

FIG. 12 illustrates the cutting part of the tape dispenser in FIG. 6.

FIG. 13A is a perspective view of the tape dispenser according to the first modification. FIG. 13B is a front view of a cutting part of the tape dispenser. FIGS. 13C and 13D are front views of other shapes of the cutting part.

FIG. 14A is a perspective view of the tape dispenser according to the second modification. FIG. 14B is a perspective view showing only the tape dispenser. FIGS. 14C and 14D are perspective views of other shapes of the tape dispenser.

DESCRIPTION OF EMBODIMENTS

An embodiment for carrying out the present invention will now be described with reference to the drawings. Note that the embodiment described herein merely exemplifies adhesive tapes, adhesive tape rolls, and tape dispensers that embody the technical ideas of the present invention, and thus are not intended to limit the scope of the present invention. The scope of the present invention is equally applicable to other embodiments included in the claims of the present invention.

Figure 1:
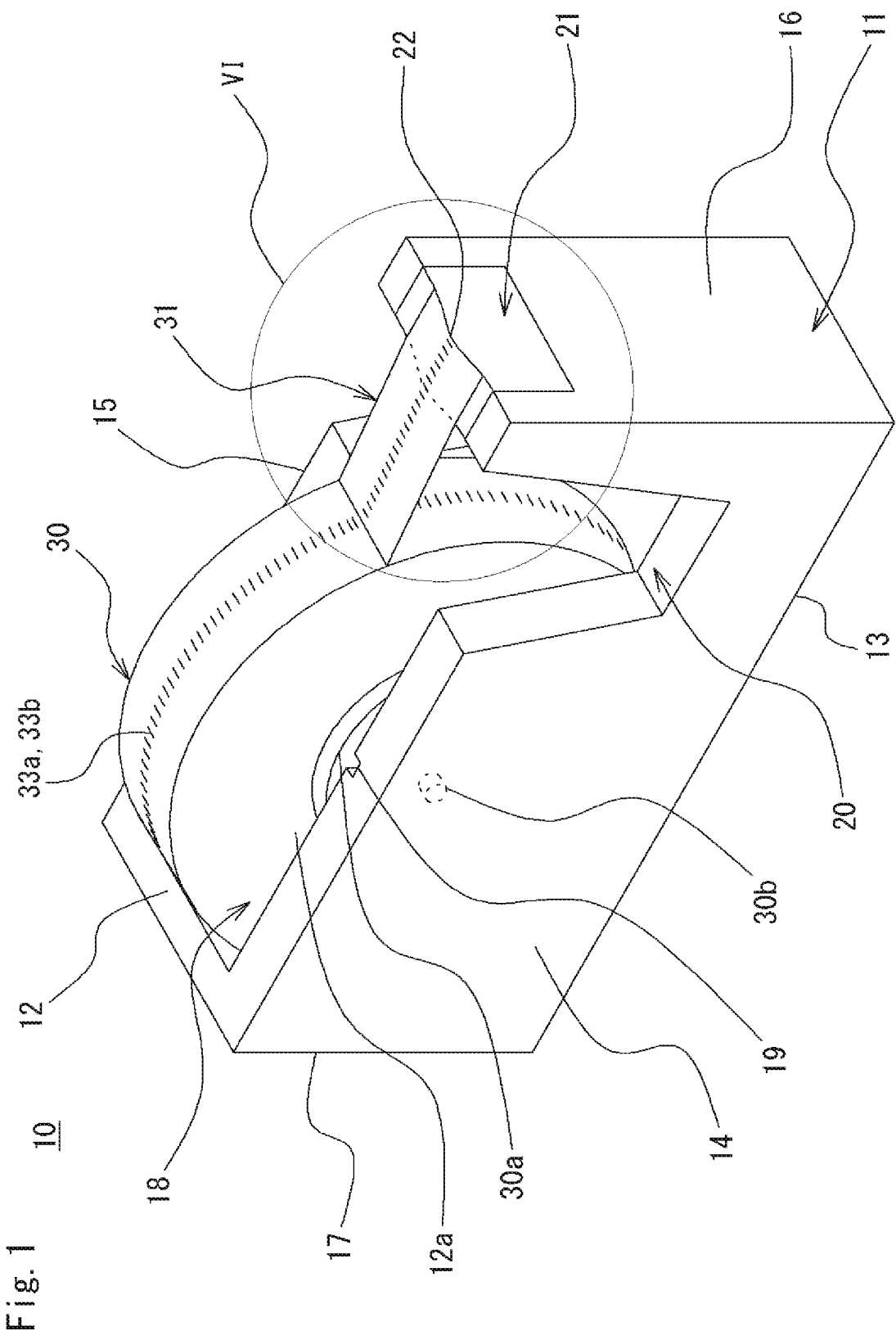
FIG. 1 is a perspective view of an entire tape dispenser to which an adhesive tape according to an embodiment of the present invention is attached to be cut in a desired length.

Referring to FIG. 1, explained is a tape dispenser (hereinafter referred to as a dispenser) 10 for cutting an adhesive tape according to an embodiment of the present invention. The tape dispenser 10 includes a tape dispenser body 11, a tape holding part 18 for holding an adhesive tape roll 30, and a cutting means 21 for cutting an adhesive tape 31 pulled out of the adhesive tape roll 30 in a desired length. The tape holding part 18 of the dispenser 10 holds the adhesive tape roll 30, from which an adhesive tape 31 is pulled out to place the end part of the adhesive tape 31 on the cutting means 21. A user can obtain a strip of the adhesive tape in a desired length by holding the end part of the adhesive tape 31 and pulling it out to a desired length, and then cutting the pulled part by the cutting means 21.

Figure 2A:
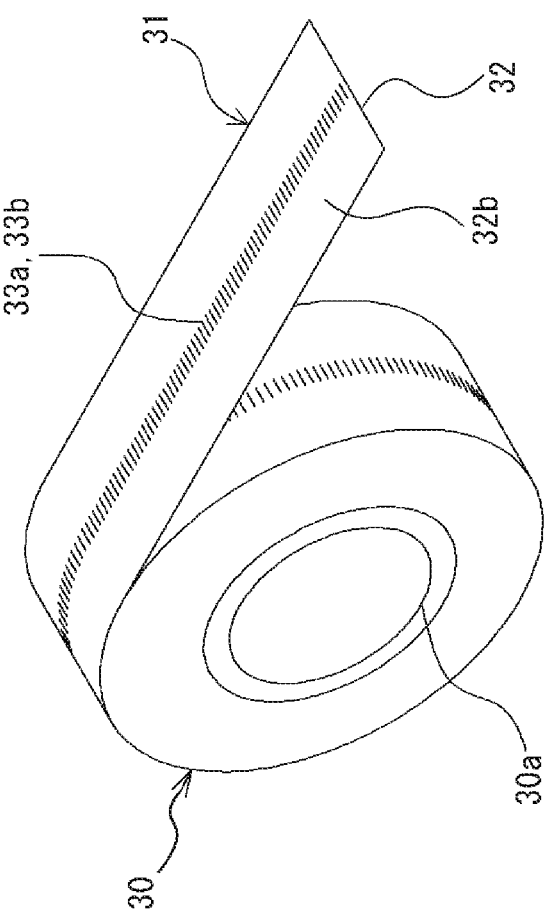
FIG. 2A is a perspective view of the adhesive tape roll according to the embodiment of the present invention.
Figure 2B:
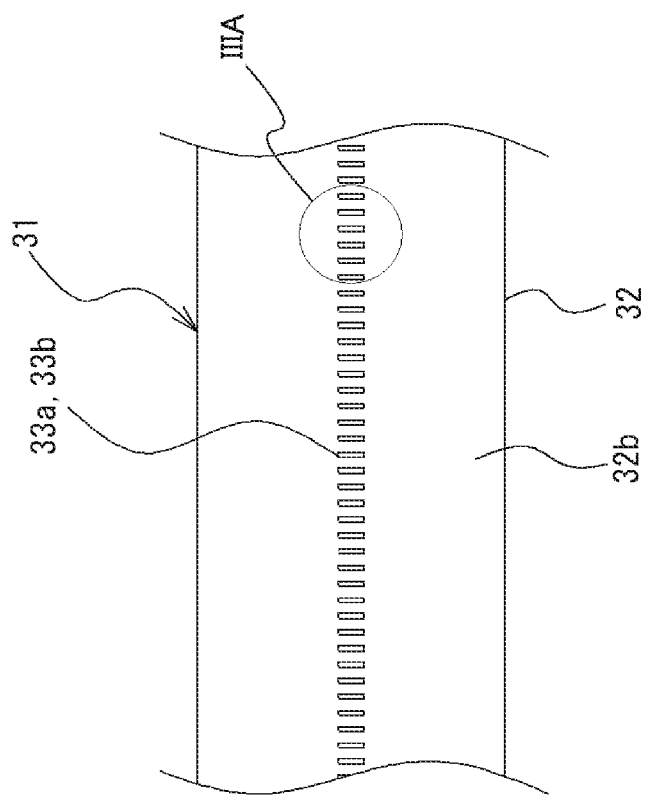
FIG. 2B is a plane view of the adhesive tape.

Referring now to FIGS. 2 through 5, explained are the adhesive tape 31 that can be cut into a desired length when attached to the dispenser 10 and the adhesive tape roll 30 around which the adhesive tape is wound. The adhesive tape 31, as shown in FIGS. 2 and 3, includes a tape 32 formed of a long cellophane strip having a predetermined width and thickness and consists of a plurality of concave grooves 33a and cracks 33b formed in one surface (hereinafter also referred to as a first surface) 32a of the tape 32, an adhesive layer 34 formed by the application of an adhesive agent in a predetermined thickness upon forming the concave grooves 33a and cracks 33b in the first surface 32a, and a releasing layer (not shown) formed by applying a releasing agent in a predetermined thickness on the other surface (hereinafter also referred to as a second surface) 32b. The concave grooves 33a and cracks 33b provided in the first surface 32a are visible through the second surface 32b, which is the front side in FIG. 2.

The long adhesive tape 31 is wound into a roll to provide the adhesive tape roll 30 as shown in FIG. 2A. The adhesive tape roll 30 includes in its center a core material 30a in a predetermined diameter, which holds the adhesive tape roll 30 in the tape holding part 18 of the dispenser 10. The material of the tape is not limited to cellophane. Any of known tape materials can be used such as paper, resin films, organic or inorganic films having natural degradability, biaxially oriented polypropylene, biaxially oriented polyethylene terephthalate, rubber, metal films, and wood films. The tape material can either be transparent or opaque, although a transparent material is used for the tape herein to explain the present embodiment. For the adhesive agent, any known agent can be used such as rubber-based adhesive agents including styrene-butadiene rubber (SBR), natural rubber, and butyl rubber, and acrylic synthesis adhesive agents. For the releasing agent, any known agent can be used such as silicone-based releasing agents.

Figure 5C:
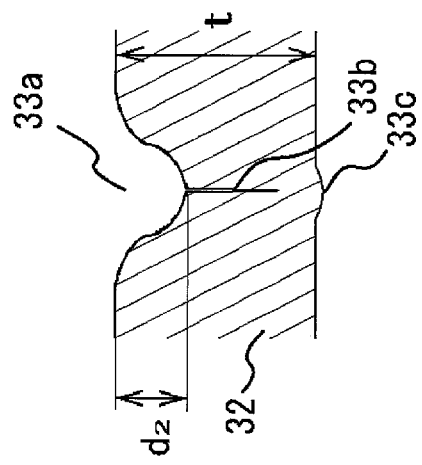
FIG. 5 illustrates side views indicating a formation process of concave grooves and cracks.

As shown in FIG. 2, one row of a plurality of concave grooves 33a and cracks 33b is arranged in the first surface 32a of the tape 32. The concave grooves 33a and cracks 33b are provided at a predetermined interval along a length direction in a region substantially inward to the center from both edges along the width direction. Note that, in FIG. 2, the first surface 32a is the back side of the tape 32, and the concave grooves 33a and cracks 33b in the back side are visible from the second surface (front side). The concave grooves 33a and cracks 33b are, of course, not visible from the second surface 32b (front side) when an opaque tape is employed. The series of concave grooves 33a and cracks 33b as shown in FIG. 3, are in the first surface 32a, each of the concave grooves 33a and cracks 33b having an opening in a predetermined size in an area surrounded by the longer sides extending in a predetermined length in an orthogonal direction to the length direction of the tape 32, and by the shorter sides extending in a width direction. That is, each of the concave grooves 33a and cracks 33b, as shown in FIG. 5C, is formed of a concave groove 33a having a predetermined depth $d_2$ and a crack 33b having a predetermined length $(d_1-d_2)$, the crack 33b being formed in a length direction of the concave grooves 33a and cracks 33b. Note that the symbol t refers to a thickness of the tape.

The series of concave grooves 33a and cracks 33b are formed by a concave groove and crack forming apparatus 40. The concave groove and crack forming apparatus 40, as shown in FIGS. 4A and 4B, includes at least one disk of rotary teeth 43 and a receiving roller 41 disposed opposing to the rotary teeth 43 with a predetermined clearance. The periphery of the rotary teeth 43 provides a plurality of teeth 43a in a predetermined pitch. The teeth 43a have the same shape each having a substantial V-shape with a sharp tip at a predetermined angle θ (Refer to FIGS. 5A and 5B). When the concave groove and crack forming apparatus 43 is in operation, the rotary teeth 43 and the receiving roller 41 rotate while the tape 32 travels therebetween, thereby forming a series of concave grooves 33a and cracks 33b in the first surface 32a of the tape 32. Note that the rotary teeth 43 are supported by supporting members 42A and 42B.

Figure 5B:
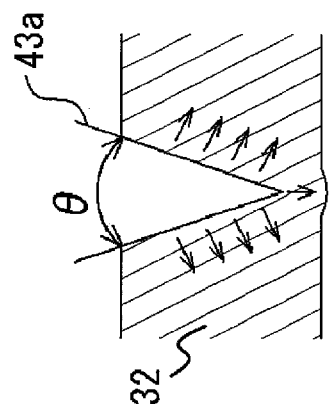
Figure 5A:
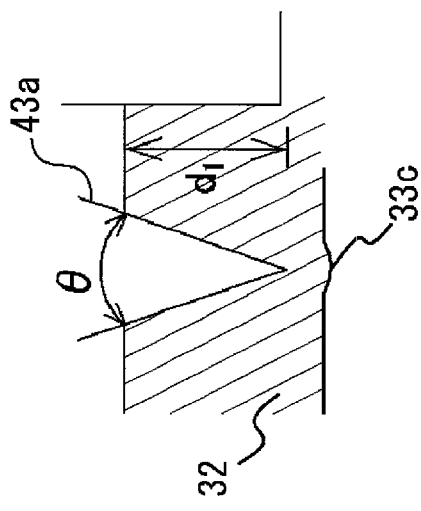

The formation process of the concave grooves 33a and cracks 33b will now be further explained. Referring to FIGS. 4A and 4B, when the tape 32 travels through the clearance between the rotary teeth 43 and the receiving roller 41, the rotary teeth 43 press the first surface 32a of the tape with the teeth tips, the tips being stuck into the first surface 32a to a predetermined depth $d_1$ to form concave grooves 33a in a predetermined depth (FIG. 5A). In other words, parts of the first surface 32a of the tape 32 are cut in a V-shape and the film material consisting the tape 32 elastically deforms in the directions of the arrows (FIG. 5B). Subsequently, the teeth tips are removed from the tape surface along with the rotation of the rotary teeth 43, the V-shaped depressed parts on the film material regain their original shapes by the elastic restoring force, or by the force applied to the opposing direction to the arrows. However, because the openings on the first surface 32a are large, the openings do not close and long and narrow openings in a predetermined depth remain, which form the concave grooves 33a. In the meanwhile, the lower side of the internal groove of each opening forms a crack 33b, as a result of the small opening being closed (FIG. 5C). In other words, the crack 33b is formed by a stronger elastic restoring force applied to the sharp tip of the V-shaped groove than the force applied to the depressed part in the upper part to the surface. On the tape 32, small protrusions 33c sticking out from the second surface 32b are formed on the surface. The small protrusions 33c are formed at the positions corresponding to the lower ends of the cracks 33b when the teeth tips of the rotary teeth 43 press the tape. The small protrusions 33c also function to indicate the difference of the tape from other conventional adhesive tapes. The small protrusions 33c, with their extremely small size, do not interfere with the coating of the second surface 32b.

As a specific example of the concave grooves 33a and cracks 33b, the rotary teeth having the angle θ 30° were stuck into the tape 32 with a thickness 40 µm to the depth of 25 µm to form concave grooves and cracks each having a concave groove of 14.2 µm in depth and a crack in the remaining depth. The angle θ of the rotary teeth 43 is preferably between 20° and 35°. If the angle is beyond this range, the width of the concave groove could become too narrow or too wide to perform a satisfactory cutting. More specifically, operational advantages of the invention cannot be obtained.

FIG. 4C illustrates another concave groove and crack forming apparatus 40A. The concave groove and crack forming apparatus 40A is capable of moving the rotary teeth 43 up and down. The vertical movement of the rotary teeth 43 facilitates the depth adjustment of the concave grooves and cracks formed in the tape 32. The position of the rotary teeth 34 is mechanically adjusted by setting the teeth in a direct contact with a surface without placing the tape 32 and setting back the teeth in a distance to obtain a required depth. This concave groove and crack forming apparatus makes it easy to adjust the cutting amount of the concave grooves 33a and cracks 33b.

The concave groove and crack forming apparatus 40 or 40A is used to provide one row of the concave grooves 33a and cracks 33b in the first surface 32a of the long tape 32 at a predetermined interval; however this method limits the production efficiency. Thus, a plurality of discs of the rotary teeth 43 are attached to each of the concave groove and crack forming apparatuses 40 and 40A to form a plurality of rows of concave grooves and cracks in a film sheet (also referred to as a raw film) having a wide area, as shown in FIG. 4D for example. The raw film is then cut substantially in-between the rows of concave grooves and cracks, that is, along the length direction, so that the rows of concave grooves and cracks are positioned substantially at the center of a long tape to be cut. This improves the productivity of the tape 32. The concave grooves and cracks are positioned to form a right angle relative to the length direction of the long tape while they may be positioned along the length direction.

Such concave grooves and cracks can be formed by changing the angle of the rotary teeth. The method of forming concave grooves and cracks is not limited to the use of these apparatuses. Other methods such as press processing and laser processing are also applicable.

The adhesive layer 34 is formed by applying an adhesive on the first surface 32a of the tape 32 in which the series of concave grooves 33a and cracks 33b are formed, that is, the surface in which the concave grooves 33a are disposed. The adhesive tape 31 is obtained once a releasing agent is applied on the second surface 32b, that is, the surface on which the small protrusions 32c are formed. Note that the concave groove portions of the concave grooves 33a in the first surface are filled with the adhesive agent (FIG. 3B).

Referring now to FIGS. 1, 6, and 7, explained is the dispenser 10. The dispenser body 11 of the dispenser 10, as shown in FIG. 1, has a box-shaped body with a top surface 12 open. The dispenser body 11 includes a rectangular bottom surface 13 serving as a placement surface when placed on a table, desk, or the like, one side surface 14 and the other side surface 15 erected from the respective longer sides of the bottom surface 13, a front surface 16 erected from a shorter side of the bottom surface 13 and containing the cutting means 21, and a rear surface 17 facing the front surface 16. An opening 12a formed on the upper surface 12 facing the bottom surface 13 serves as an insertion part of the adhesive tape roll 30.

Also, the dispenser body 11 includes the tape holding part 18 for holding the adhesive tape roll 30 on the side surface 14 and the side surface 15. The tape holding part 18 may be configured to hold the adhesive tape roll 30, for example, by forming grooves 19 inside of the side surfaces 14 and 15 and using the grooves in combination with a shaft part 30b provided in the rotatable core material 30a on which the adhesive tape roll 30 is attached. In this case, the tape holding part 18 is formed by the bottom surface 13, the side surfaces 14 and 15, and the rear surface 17 of the tape dispenser body 11. The configuration of the tape holding part 18 is not limited thereto, and a known configuration may be used.

Notch parts 20 are formed in the respective side surfaces 14 and 15 at the side closer to the cutting means 21. The notch parts 20 are the parts through which a user inserts his/her fingers or the like to pull out the adhesive tape 31. Note that the shape of the notch parts is not limited to the shape illustrated in FIG. 1. They can take any shape as long as they allow pinching and pulling out of the adhesive tape.

The cutting means 21 provided on the front surface 16 of the dispenser body 11 is the part used to cut the adhesive tape 31 pulled out of the adhesive tape roll 30 in a desired length into a strip of the adhesive tape 31 for use. The cutting means 21 includes a cutting part 22 for cutting the adhesive tape 31. The cutting part 22, as shown in FIG. 6, includes a convex top part 23 at the center in the width direction of the adhesive tape 31, and is formed in a curved shape including the top part 23. In addition, the angle of the top part is formed obtuse, thereby forming a gently angled shape. Note that the adhesive tape 31 is cut at a front end 24 of the cutting part 22, that is, the part furthest away from the tape holding part 18. The cutting part 22 may be formed either together with the front surface or as a separate part and be combined with the front surface.

When the adhesive tape 31 is cut, as shown in FIG. 7A, the adhesive tape 31 is firstly pulled out of the adhesive tape roll 30 to a desired length, and pressed against the cutting part 22 of the cutting means 21. At this time, the top part 23 of the cutting part 22 is aligned with a concave groove 33a and crack 33b of the adhesive tape 31. The adhesive tape 31 is then pulled downward or obliquely downward from the cutting part 22, and the top part 23 of the cutting part 22 cuts the concave groove 33a and crack 33b in the adhesive tape 31.

In other words, when the adhesive tape is cut by the dispenser, the dispenser's angled protrusion having the obtuse top part abuts the tape's surface on which the adhesive layer 34 is provided. The opening of one of the concave grooves 33a then opens and expands, which tears the adhesive tape 31 from the crack 33b. Accordingly, the adhesive tape 31 is cut across the whole width (refer to FIG. 7B). Note that the dispenser can be used safely and easily without causing injuries to one's fingers or the like because the dispenser employs an angled protrusion having an obtuse top part instead of conventional sharp cutting blades.

Even if the adhesive tape is pressed against the cutting part at a position where a cut portion does not meet the top part of the cutting part, the adhesive tape is displaced on the cutting part by being pulled out until it reaches a position where a cut portion meets the top part, thereby allowing easy cutting.

Figure 12A:
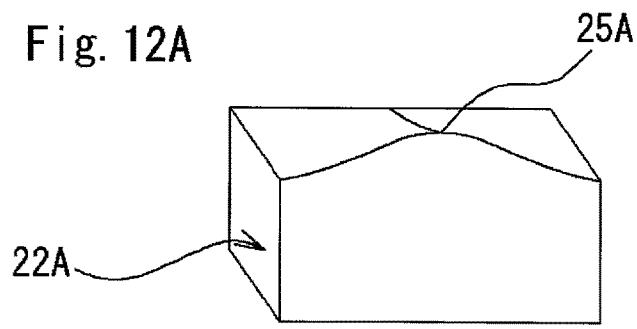
FIG. 12A is a perspective view of another configuration of the cutting part.
Figure 12B:
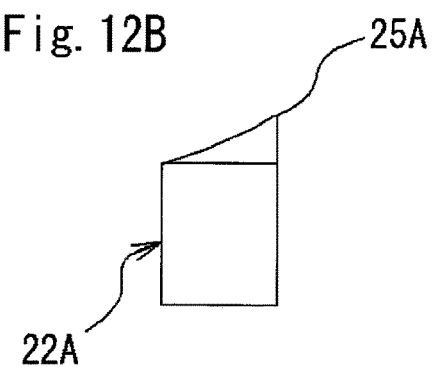
FIG. 12B is a side view of FIG. 12A viewed from one side.
Figure 12C:
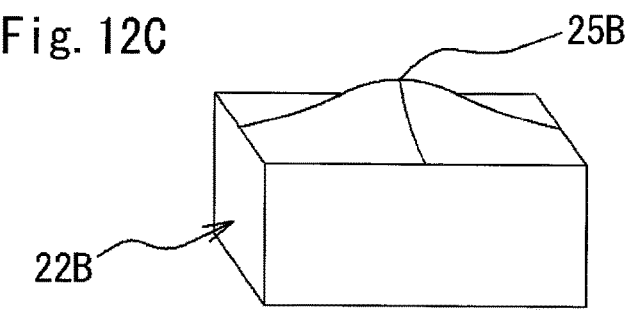
FIG. 12C is a perspective view of yet another configuration of the cutting part.
Figure 12D:
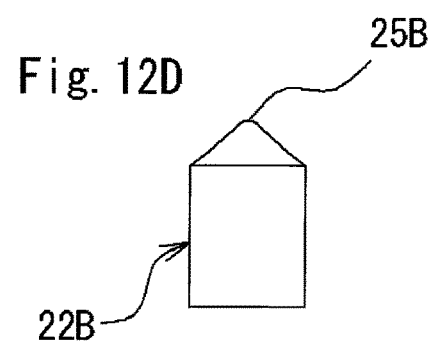
FIG. 12D is a side view of FIG. 12C viewed from one side.
Figure 12E:
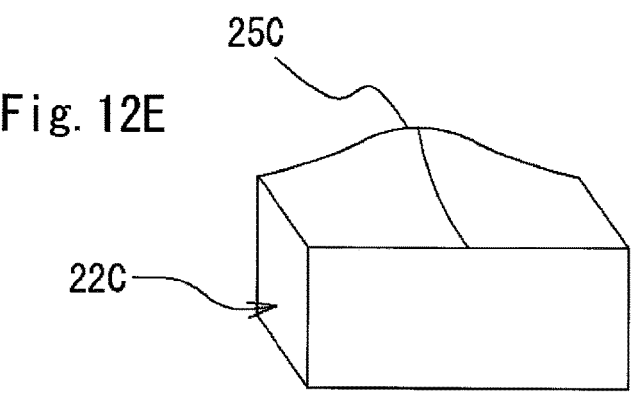
FIG. 12E is a perspective view of still another configuration of the cutting part.
Figure 12F:
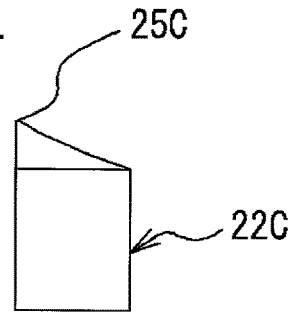
FIG. 12F is a side view of FIG. 12F viewed from one side.

Also note that the shape of the cutting part 22 is not limited to that shown in the embodiment. It may have various shapes such as the ones shown in FIG. 12. The cutting part 22A shown in FIGS. 12A and 12B is formed to have an apex 25A that is the highest point of the cutting part 22A. The apex 25A is formed at the position furthest away from the tape holding part 18 in the length direction of the adhesive tape 31, the height of the cutting part 22A being gradually lowered toward the tape holding part 18. The cutting part 22B shown in FIGS. 12C and 12D has an apex 25B at the center of the cutting part 22B to form the highest point thereof. The cutting part 22C shown in FIGS. 12E and 12F has an apex 25C at the position closest to the tape holding part 18 to form the highest point thereof. This configuration concentrates the stress applied to a cut portion of the adhesive tape, and thus allows the adhesive tape to be cut with a small force.

Figure 12G:
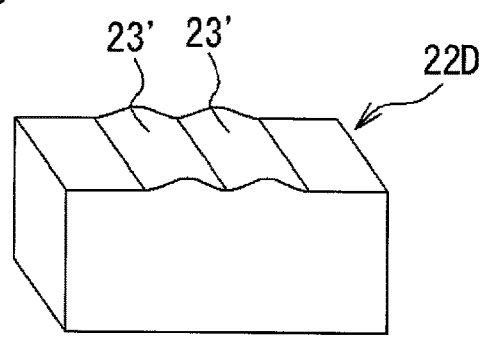
FIGS. 12G and 12H are perspective views of still other configurations of the cutting part.
Figure 12H:
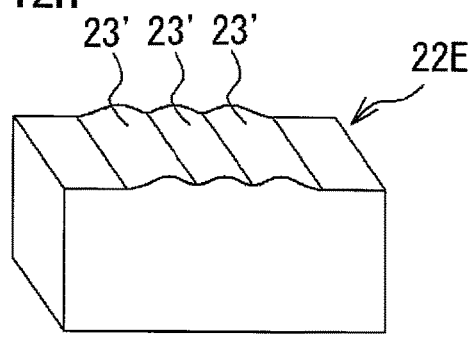

The number of the top parts 23 of the cutting part 22 is not limited to one, but a plurality of top parts 23' can be formed, such as a cutting part 22D shown in FIG. 12G and a cutting part 22E in FIG. 12H. This configuration enables a cut portion of the adhesive tape be aligned with a top part of the cutting part to ensure successful cutting even when the adhesive tape is obliquely pulled out.

The following describes examples and comparative examples.

Example 1A

A tape made of biaxially oriented polypropylene (hereinafter referred to as OPP) with a width of 18 mm and a thickness of 30 μm was provided with a row of concave grooves and cracks at the center of the tape in a length direction, each concave groove and crack having a length of 2 mm and a depth of 15 μm and being positioned at a 2.1 mm interval. An adhesive agent was then applied to one surface of the tape to produce an adhesive tape.

Comparative Example 1A

Another adhesive tape was produced to compare with the adhesive tape of Example 1A. A tape made of OPP and having a width of 18 mm and a thickness of 30 μm was provided with randomly positioned through-holes in an elongated shape with 2 mm in length. An adhesive agent was then applied to one side of the tape to produce the adhesive tape.

Example 2A

The tape of Example 1A was provided with concave grooves and cracks with a length of 2 mm and a depth of 20 μm at a 2.1 mm interval to produce an adhesive tape.

Example 3A

The tape of Example 1A was provided with concave grooves and cracks with a length of 2 mm and a depth of 25 μm at a 2.1 mm interval to produce an adhesive tape.

Example 1B

The same adhesive tape as Example 1A was used.

Example 2B

The same adhesive tape as Example 2A was used.

Example 3B

The same adhesive tape as in Example 3A was used.

Comparative Example 1B

The same adhesive tape as Comparative Example 1A was used.

A tensile strength test and a tape dispenser test were conducted using the adhesive tapes of these examples and comparative examples. The results are described in Table 1.

TABLE 1

|  |  | Hand-tearing property Unit: N | Unintended out Unit: % | Maximum number of winding Unit: m | Coating | Evaluation |
|---|---|---|---|---|---|---|
| Tensile strength test N/18 mm | Example 1A | 21.1 | 0 | 4000 | ○ | ○ |
|  | Example 2A | 18.6 | 0 | 4000 | ○ | ○ |
|  | Example 3A | 17.6 | 0 | 4000 | ○ | ○○ |
|  | Comparative example 1A | 21.8 | 10 | 1000 | x | x |
| Dispenser N/18 mm | Example 1B | 2.3 | 0 | 4000 | ○ | ○ |
|  | Example 2B | 1.4 | 0 | 4000 | ○ | ○ |
|  | Example 3B | 1.1 | 0 | 4000 | ○ | ○○ |

TABLE 1-continued

|  | Hand-tearing property Unit: N | Unintended out Unit: % | Maximum number of winding Unit: m | Coating | Evaluation |
|---|---|---|---|---|---|
| Comparative example 1B | 3.3 | 10 | 1000 | x | x |

(Note)
oo: Best,
o: Good,
x: Not good

[Evaluation]

The results of the tests revealed that, regarding the tensile strength, the hand-tearing properties were substantially the same between the comparative example and the example with shallow concave grooves, while the hand-tearing property improved for deeper concave grooves. The hand-tearing property of the adhesive tape with a depth of 25 μm was 17.6 N in comparison with 21.8 N of Comparative Example 1A, improved by approximately 20%. When the dispenser is used, the difference in the hand-tearing property improved by 2 to 3 times, allowing the tape to be cut with a force that is half or less than the force required to cut the adhesive tape of Comparative Example 1B. It was also found that the hand-tearing property varied depending on the depth of the concave grooves. Accordingly, the test proved that the depth of concave grooves can be used to adjust the hand-tearing property of an adhesive tape. Meanwhile, if the concave grooves penetrate the tape, the surface of the tape projects and such projections result in bulkiness of the tape, making it unsuitable for mass production. Furthermore, the projections also destabilize the coating. Therefore, coating cannot be applied after through-holes are formed. The forming of through-holes is limited to only after coating. A concave groove having a depth between 20 and 25 μmm is most suitable for a 30 μmm film.

Figure 8:
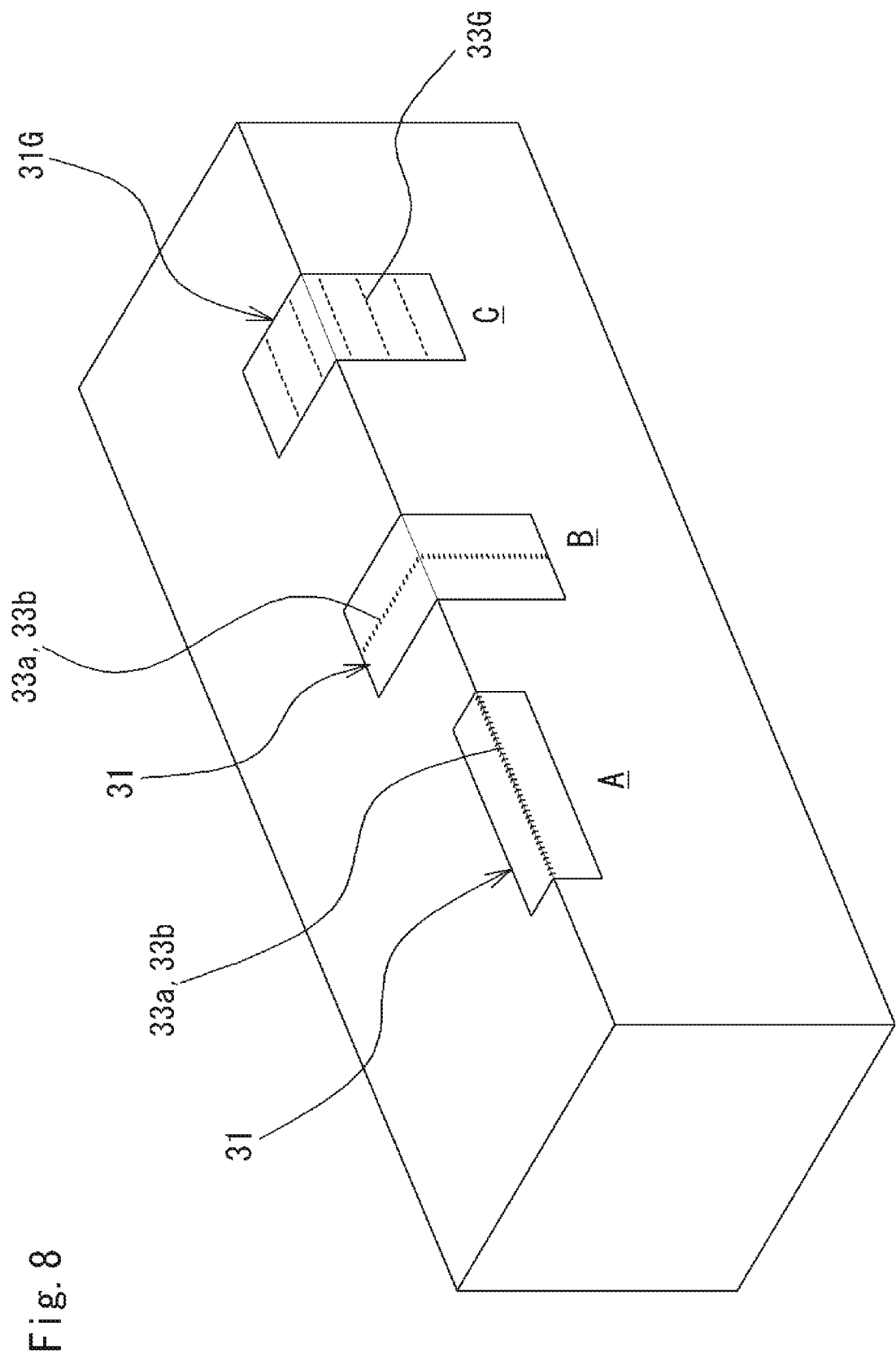
FIG. 8 is a perspective view illustrating a comparison of use between a conventional adhesive tape and an adhesive tape according to an embodiment of the present invention.

FIG. 8 illustrates applications of the adhesive tape 31 according to the embodiment and an exemplary conventional adhesive tape 31G with perforations 33G formed thereon. The exemplary conventional adhesive tape, as shown in the application example C, includes the perforations 33G to each edge portion of the adhesive tape 31G. In addition, because the perforations penetrate the tape, the adhesive tape 31G has a risk of tearing of the perforations, for example, during transportation of a package, leading to a cut of the tape. In contrast, the adhesive tape 31 of the embodiment includes the concave groove 33a and crack 33b only in a center region along the length direction of the adhesive tape 31. Therefore, it has a low risk of cuts even if the tape is applied in the same manner as the application examples A and B thanks to the high strength of the concave groove 33a and crack 33b. In addition, in the application examples A and B, users can easily cut the adhesive tape by pressing their fingers, nails, or the like against the concave groove and crack. This means that users can cut the already-applied adhesive tape without having to use a cutter.

Referring to FIGS. 9 through 11, modifications of the adhesive tape will be explained.

[First Modification of the Adhesive Tape]

An adhesive tape 31A according to a first modification, as shown in FIG. 9, includes an identification marking 35 in a different color from that of the tape 32. The identification marking 35 is provided on the second surface of the tape 32 at a position facing the series of concave grooves 33a and cracks 33b. The identification marking allows users to recognize the adhesive tape having the features described above and being different to conventional adhesive tapes. For example, users can determine that the adhesive tape can be easily cut without having to use a cutting device such as a knife. The position of the identification marking 35 is not limited to a position on the second surface of the tape 32 facing the concave grooves and cracks. The identification marking 35 may be disposed at any position such as a position on the first surface or a position displaced from the concave grooves and cracks. The identification marking may be in any form. It can have any color, figure, symbol, or any combination thereof.

[Second Modification of the Adhesive Tape]

Figure 10B:
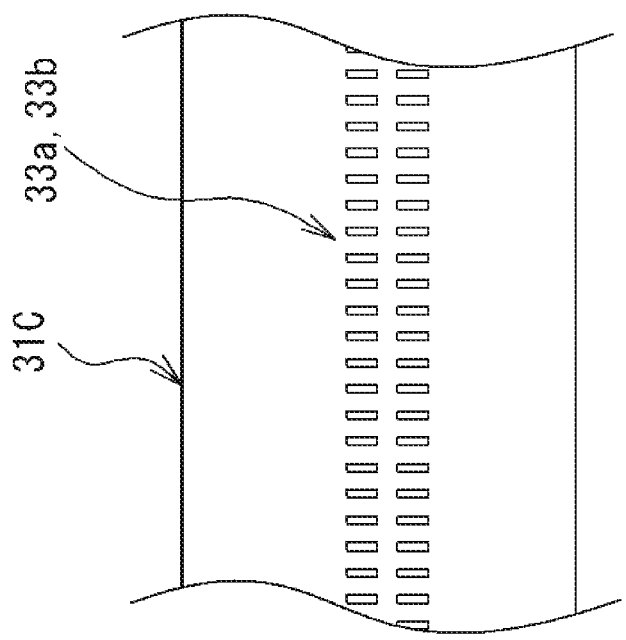
FIG. 10B is a plane view of an adhesive tape according to a third modification.
Figure 10A:
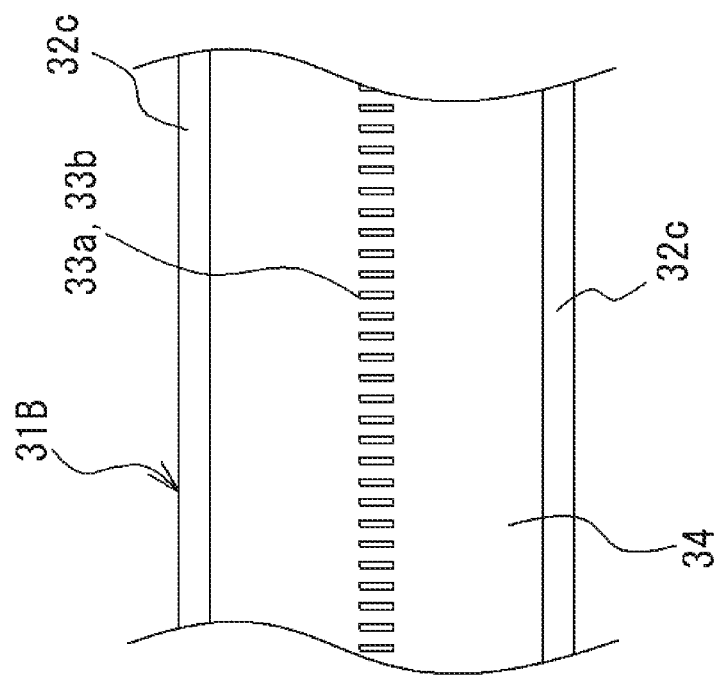
FIG. 10A is a plane view of an adhesive tape according to a second modification.

An adhesive tape 31B according to a second modification, as shown in FIG. 10A, has an adhesive agent applied on the tape 32 except on each edge portion of the tape 32 along the length direction. Uncoated parts 32c provided on the adhesive tape 31B in the manner described above allow the adhesive tape to be easily removed after being used.

[Third Modification of the Adhesive Tape]

An adhesive tape 31C according to a third modification, as shown in FIG. 10B, includes a plurality of rows of concave grooves 33a and cracks 33b, for example, two rows of the concave grooves 33a and cracks 33b, in a tape 32C of the adhesive tape 31C. Such a configuration allows the top part of the cutting part of the dispenser to abut a concave groove on the adhesive tape without fail.

[Fourth and Fifth Modifications of the Adhesive Tape]

Figure 11A:
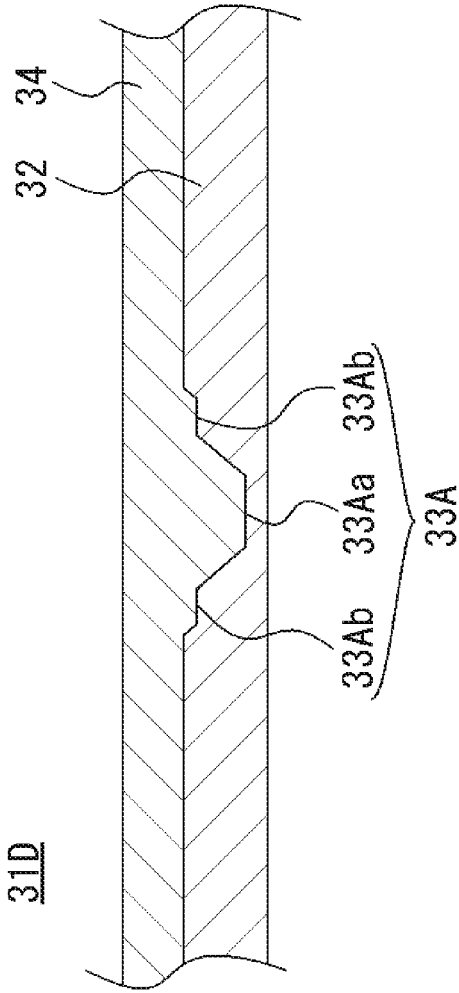
FIG. 11A is a sectional view of an adhesive tape according to a fourth modification.

An adhesive tape 31D according to a fourth modification includes concave grooves 33A as shown in FIG. 11A. Each of the concave grooves 33A formed in a tape 32A includes wide shallow concave grooves 34Ab on the outer sides of a narrow deep concave grooves 34Aa. Such a shape of the concave grooves 33A allows shallow concave grooves 34Ab to guide a cut formed in the deep concave grooves 34Aa to facilitate linear cutting of the adhesive tape 31D. The shape of the concave grooves 33A can be formed by changing the shape of a teeth-shaped roller used in the manufacturing process described above. The shape of the slits may be a V-shape, U-shape, groove, or the like known in the art.

Figure 11B:
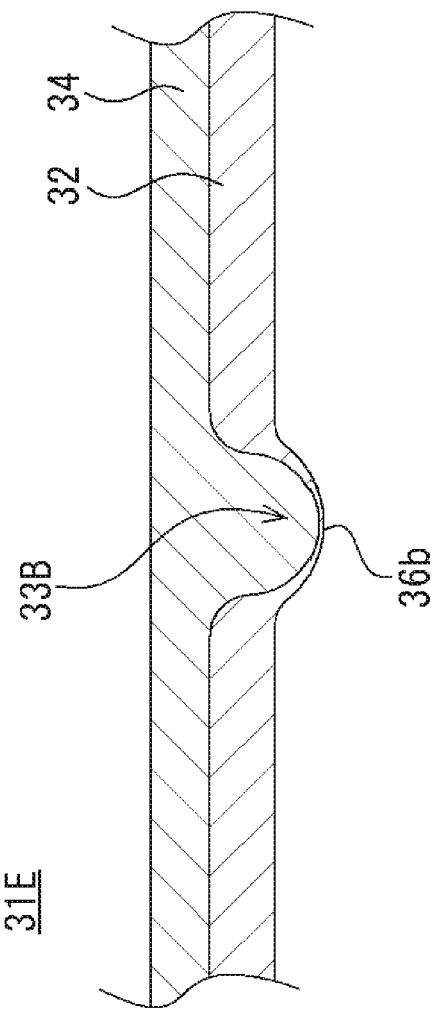
FIG. 11B is a sectional view of an adhesive tape according to a fifth modification.

An adhesive tape 31E according to a fifth modification includes concave groove 33B as shown in FIG. 11B. Each of the concave groove 33B may have such a shape that a bottom part 36B of the concave groove 33B is the thinnest and the thickness gradually increases from the bottom part 36B toward the top surface. The shape of each slit 33B is formed by depressing a portion of the tape 32B so that the portion bulges out and then an adhesive material is applied on the tape. Such configuration allows the cutting part 22 of the cutting tool 21 to easily cut the thinnest part at the bottom part 36B of the concave groove 33B while providing thickness to the other part, and thereby providing the sufficient strength. Note that this shape is preferably applied to a tape made of a resin material or the like such as a plastic film, which has elasticity in the tape material.

The adhesive tapes 31D and 31E of the fourth and fifth modifications can both be cut by a dispenser that cuts the adhesive tape 31 or the like. The operational advantages thereof are also substantially the same.

When the adhesive tape 31D is cut, the adhesive tape 31 is first pulled out of the adhesive tape roll 30 to a desired length, and then pressed against the cutting part 22 of the cutting means 21. At this time, the top part 23 of the cutting part 22 is aligned with a deep groove 34Aa of the adhesive tape 31D. The adhesive tape 31D is then pulled downward or obliquely downward from the cutting part 22, and the top part 23 of the cutting part 22 cuts the deep groove 34Aa and shallow groove 34Ab in the adhesive tape 31.

In other words, when the adhesive tape is cut by the dispenser, the dispenser's angled protrusion having the obtuse top part abuts the tape's surface on which the adhesive layer 34 is provided. The opening of one of the shallow groove 34Ab then opens and expands, which tears the adhesive tape 31D from the shallow groove 34Ab. Accordingly, the adhesive tape 31D is cut across the whole width. Note that the dispenser can be used safely and easily without causing injuries to one's fingers or the like because the dispenser employs an angled protrusion having an obtuse top part instead of conventional sharp cutting blades.

The same principle applies to the adhesive tape 31E as well.

The concave grooves 33a and cracks 33b are formed at a predetermined interval in a row in the length direction of the tape 32. The length of each concave grooves 33a and cracks 33b is determined by the width of the tape 32. Forming long concave grooves 33a and cracks 33b in a narrow tape decreases the strength of the tape and makes the tape easy to cut, while forming short concave groove and cracks makes the tape difficult to cut. Thus, the length of each concave groove and crack is preferably 2 to 3 mm for a tape with a width of 12 mm, and 2 to 4 mm for a tape with a width of 18 mm, for example. For a tape with a wider width, concave grooves and cracks are preferably formed at a predetermined interval in a plurality of rows, with each of the concave grooves and cracks having a length of approximately 2 to 5 mm. The reason for forming a plurality of rows of concave grooves and cracks with a width being 2 to 5 mm in the tape with a wider width is to prevent the tape from being easily cut. If the length described above is increased, the tape decreases in strength and becomes easy to cut. Also, setting the interval between the concave grooves and cracks as narrow as possible enables a user to cut the adhesive tape in a desired length. However, if the interval is too narrow, the adhesive tape is weak in strength when pulled or used. Therefore, the interval between the concave grooves and cracks is preferably approximately between 1.5 and 3 mm. That is, the length of concave grooves and cracks and the interval between concave grooves and cracks may optionally be changed according to the aspect of the adhesive tape or the condition of its use. For example, for packaging a box, an adhesive tape with a wide concave groove and crack interval may be used because long strips of the adhesive tape are used. On the other hand, for posting a piece of paper or the like, an adhesive tape with a narrow concave groove and crack interval may be used in order to be cut into short strips.

In addition, the application of an adhesive material is not limited to one surface of the adhesive tape according to the embodiment. The adhesive tape may have an adhesive agent applied to the second surface of the tape or to both sides on the first and the second surfaces.

The adhesive tape according to the embodiment configured as described above provides the following effects. That is:

(a) The adhesive tape has concave grooves and cracks, and thus can be safely and easily cut by a cutting means including an angled protrusion having an obtuse top part without causing an injury to a user's fingers or the like.

(b) Without the use of such a cutting means, the adhesive tape can also be cut easily with a force of the tips of one's fingers or nails. Even after applied to a target object, the adhesive tape can still be cut easily with a force of the tips of one's fingers or nails without use of a cutting device such as a knife.

(c) In addition, the tensile strength required for conventional adhesive tapes is maintained because the concave grooves and cracks do not penetrate the tape, thereby preventing an unintended cut or breakage. Specifically, an unintended cut or breakage of the adhesive tape can be prevented during a manufacturing process of the tape or during the application of the tape to products, as well as during distribution of the products with the tape attached thereto.

(d) Furthermore, satisfactory processing, such as printing, can be performed on the second surface because the concave grooves and cracks do not penetrate the adhesive tape. Also, a larger length of the tape can be wound around the roll without being bulky.

Referring to FIGS. 13 and 14, modifications of the dispenser will be explained.

[First Modification of the Dispenser]

A dispenser 10S of a first modification may have the configuration as shown in FIG. 13A besides the configuration of the dispenser 10 according to the embodiment described above and shown in FIG. 1. With the configuration of the dispenser 10S of the first modification, a user can hold the cutting tool and apply the adhesive tape with one hand.

The tape dispenser 10S of the first modification includes, as shown in FIG. 13A, a dispenser body 21S, a tape holding part 18S for rotatably holding the adhesive tape roll 30 in the dispenser body 21S, and a cutting means 22S for cutting the adhesive tape 31 pulled out of the adhesive tape roll 30. The dispenser body 21S includes a connection part 39S for connecting the tape holding part 18S and a cutting means 22S. Note that the connecting part 39S includes a feed roller 40S for feeding the adhesive tape 31 and a pressure roller 41S for pressing the adhesive tape 31 against an adherend part. The adhesive tape roll 30 and the adhesive tape 31 used for the dispenser 10S of the modification can have the same configuration as that explained in the embodiment.

The cutting part 22S of the dispenser 10S, as shown in FIGS. 13A and 13B, is shaped with a convex top part 23S at the center in the width direction of the adhesive tape 31, and is formed in a curved shape including the top part 23S. In addition, the angle of the top part 23S is formed obtuse, thereby forming a gently angled shape. The adhesive tape 31 is cut by the top part 23S of the cutting part 22S. Note that the cutting part 22S of the modification is formed of a thin plate, and has a length in the length direction of the adhesive tape 31 different to that of the cutting part 22 of the embodiment.

The dispenser 10S of the first modification is used in such a manner that the adhesive tape 31 is pulled out of the adhesive tape roll 30 while the pressure roller 41S presses the adhesive tape 31. After a desired length of the adhesive tape 31 has been applied, the cutting tool 10S is tilted so that a concave groove and crack in the adhesive tape 31 is pressed against the cutting part 22S of the cutting means 21S and the adhesive tape 31 is cut from the cut portion 34. Note that details are the same as the embodiment and therefore detailed explanations are omitted.

As described above, the dispenser 10S of the first modification can also provide the same effects as those of the dispenser 10 according to the embodiment.

Note that the cutting part of the first modification may be shaped with a plurality of top parts 23S' in the same manner as a cutting part 22S1 shown in FIG. 13C and a cutting part 22S2 in FIG. 13D.

Also, the dispenser of the first modification is not limited to one including a feed roller and a pressure roller as explained, but it may include only a pressure roller.

Second Modification of the Dispenser

A dispenser 10T of a second modification is configured to be directly attached to the adhesive tape roll 30 as shown in FIG. 14A. The dispenser 10T includes an attachment part 42T for being attached to the adhesive tape roll 30, and a cutting means 21T for cutting the adhesive tape 31.

The attachment part 42T, as shown in FIGS. 14A and 14B, includes a pair of arm parts 43T for being wrapped around and holding the adhesive tape roll 30. Once the dispenser 10T is attached to the adhesive tape roll 30, it can move freely along the adhesive tape roll 30 by the arm parts 43T. Note that the same adhesive tape roll 30 and adhesive tape 31 as those of the embodiment are used.

The cutting means 21T includes a cutting part 22T for cutting the adhesive tape 31 and a placement part 44T for temporarily placing the adhesive tape. The cutting part 22T, as shown in FIGS. 14A and 14B, includes a convex top part 23T at the center in the width direction of the adhesive tape 31, and is formed in a curved shape including the top part 23T. In addition, the angle of the top part 23T is formed obtuse, thereby forming a gently angled shape. The cutting part 22T of the second modification is formed of a thin plate in the same manner as the cutting part 22S of the first modification. The cutting part 22T is formed so as to erect in a radiation direction from the center of the adhesive tape roll 30.

The placement part 44T is a part on which an end part of the adhesive tape 31 is temporarily placed once pulled out of the adhesive tape roll 30. This part allows a user to easily find and pull out the end part of the adhesive tape when using it the next time. While the placement part 44T shown in FIGS. 14A and 14B has a flat surface, it can be formed so that a part of which may erect in the radiation direction from the center of the adhesive tape roll 30.

When the adhesive tape 31 is cut, the adhesive tape 31 is pulled out by the end part of the adhesive tape roll 30 to a desired length, and pressed against the cutting part 22T. The cut portion 34 in the adhesive tape 31 is cut by the top part 23T of the cutting part 22T and the adhesive tape is cut. Note that the details of cutting the adhesive tape 31 are substantially the same as the embodiment and therefore the explanations are omitted.

With such a configuration, small cutting tools with a simple structure can also cut an adhesive tape easily.

Like a dispenser 10U shown in FIG. 14C, a cutting part 22U may extend in a horizontal direction relative to the radial direction from the center of the adhesive tape roll 30. Also, like a cutting tool 10V shown in FIG. 14D, an attachment 42T may include separators 45V parallel to the cutting part 22T for separating the adhesive tape 31 from the adhesive tape roll 30. Note that the other components are the same as those of the dispenser in FIG. 14B. Also note that all the dispensers explained herein, including the dispenser 10, are not limited to the use for the adhesive tape 31 or the like, but also are applicable to the use of other adhesive tapes of similar kinds.

REFERENCE SIGNS LIST 10, 10S, 10T, 10U, 10V: Dispensers
11, 11S, 11T: Dispenser bodies
20: Cut portion
21, 21S, 21T: Cutting means
22, 22A, 22B, 22C, 22D, 22E, 22S, 22S$_1$, 22S$_2$, 22T, 22U: Cutting parts
23, 23', 23S, 23S', 23T: Top parts
25A, 25B, 25C: Apexes
30: Adhesive tape roll
31, 31A, 31B, 31C, 31D, 31E: Adhesive tapes
32, 32A, 32B, 32C, 32E: Tapes
33B: Concave groove and crack
33$a$: Concave groove
33$b$: Crack
34: Adhesive layer
40, 40A: Concave groove and crack forming apparatuses
43: Rotary teeth

The invention claimed is:

1. An adhesive tape comprising: a tape made of a long plastic film having a predetermined width and a predetermined thickness; and an adhesive layer disposed on a first surface of the tape, wherein
    the tape has a plurality of concave grooves and cracks extending along the width direction, and the concave grooves and cracks are provided at predetermined intervals in the length direction in a center region that is inward from both edges of the first surface of the tape,
    each of the concave grooves is an elongate groove that is recessed to a predetermined depth from a surface of the first surface,
    each of the cracks starts at a bottom of the concave groove, and extends towards, but does not contact a second surface, and
    the adhesive layer is formed on the first surface and in the concave grooves.

2. The adhesive tape according to claim 1, wherein the adhesive layer is formed on the tape except on a region in a predetermined width from at least one edge portion in a width direction of the tape.

3. The adhesive tape according to claim 1, wherein the tape is provided with a tape identification marking on at least one of the first or the second surface.

4. An adhesive tape roll around which the adhesive tape according to claim 1 is wound into a roll with a releasing agent applied on the second surface.

5. A tape dispenser comprising: a tape holding part for rotatably holding the adhesive tape roll according to claim 4; and cutting means for cutting the adhesive tape pulled out of the adhesive tape roll, wherein
    the cutting means comprises a cutting part including an angled protrusion having an obtuse top part at a center in a width direction of the adhesive tape.

6. A tape dispenser comprising: an attachment part that is attached to the adhesive tape roll according to claim 4; and cutting means for cutting the adhesive tape pulled out of the adhesive tape roll, wherein
    the attachment part comprises arm parts for being wrapped around and holding the adhesive tape roll, and the cutting means comprises a cutting part including an angled protrusion having an obtuse top part at a center in a width direction of the adhesive tape.

7. The adhesive tape according to claim 1, wherein there is a single crack per groove.

\* \* \* \* \*